United States Patent [19]

Johnson

[11] Patent Number: 4,900,403
[45] Date of Patent: Feb. 13, 1990

[54] RECOVERY OF GAS DISSOLVED IN FLUE CONDENSATE

[75] Inventor: Arthur F. Johnson, Boulder, Colo.

[73] Assignee: Energy Conservation Partnership, Ltd., Boulder, Colo.

[21] Appl. No.: 264,721

[22] Filed: Oct. 31, 1988

Related U.S. Application Data

[60] Division of Ser. No. 96,770, Sep. 11, 1987, Pat. No. 4,781,797, which is a continuation of Ser. No. 743,137, Jun. 10, 1985, abandoned.

[51] Int. Cl.$^4$ .......................... B01D 3/10; B01D 19/00
[52] U.S. Cl. .......................................... 203/78; 203/80; 203/91; 203/94; 203/DIG. 6; 55/41; 55/55; 55/73; 159/47.1; 202/173; 202/205
[58] Field of Search .......... 203/91, 94, 87, 29, 203/DIG. 6, 73, 78, 80, 98; 202/158, 173, 175, 155, 187, 161, 185.1, 185.6, 205, 236, 237; 261/94, 112.1, 113; 55/55, 73, 189, 38, 40, 46, 41; 159/13.2, DIG. 16, 47.1

[56] References Cited

U.S. PATENT DOCUMENTS

| | | | |
|---|---|---|---|
| 1,317,688 | 10/1919 | Davenport | 55/38 |
| 1,724,421 | 8/1929 | Richter | 55/38 |
| 1,968,512 | 7/1934 | Young | 203/91 |
| 2,585,202 | 2/1952 | Whitney | 202/205 |
| 2,764,533 | 9/1956 | Oetjen et al. | 202/205 |
| 2,905,596 | 9/1959 | Findlay | 202/187 |
| 2,981,665 | 4/1961 | Kloss | 202/158 |
| 3,105,020 | 9/1963 | Silver et al. | 202/173 |
| 3,146,177 | 8/1964 | Chalmers et al. | 202/173 |
| 3,165,452 | 1/1965 | Williams | 202/173 |
| 3,233,389 | 2/1966 | Dahlen | 202/158 |
| 3,324,012 | 6/1967 | Roe et al. | 202/187 |
| 3,370,635 | 2/1968 | Kumm | 202/237 |
| 3,506,408 | 4/1970 | Kageyama et al. | 203/DIG. 6 |
| 3,822,192 | 7/1974 | Brown | 202/187 |
| 3,985,625 | 10/1976 | Bjerg | 202/158 |
| 4,213,847 | 7/1980 | Chen et al. | 203/DIG. 6 |
| 4,334,952 | 6/1982 | Tkac et al. | 202/187 |
| 4,475,005 | 10/1984 | Paret | 203/DIG. 6 |
| 4,602,923 | 7/1986 | Bernstein | 55/55 |

*Primary Examiner*—Wilbur Bascomb
*Attorney, Agent, or Firm*—Pennie & Edmonds

[57] ABSTRACT

An apparatus and process for separating a more volatile substance from a liquid in which it is dissolved by vacuum means. The apparatus has a perforated inner casing having a plurality of sub-stages which contain packing material to provide a tortuous path of interstices for the liquid to flow through; an outer casing surrounds the inner casing to define an evacuating space between the outer and inner casing and vacuum means to create a vacuum in the evacuating space which communicates with the sub-stages through the perforations in the inner casing. The vacuum means also acts to pull off the more volatile substance.

5 Claims, 5 Drawing Sheets

RECOVERY OF GAS DISSOLVED IN FLUE CONDENSATE

This is a division of application Ser. No. 96,770, now U.S. Pat. No. 4,781,797, filed Sept. 11, 1987, which was a continuation of Ser. No. 743,137, filed June 10, 1985, now abandoned.

BACKGROUND OF THE INVENTION

The invention relates to recovery of gases and in particular to the recovery of sulphur-dioxide from the water of condensation of flue gases.

With the growing attention being given environmental protection recently, and the increasing attention given acid rain, a surge in effort has been present in looking for better ways to clean or "scrub" flue gases from fossil fuel plants before exhausting them to the atmosphere. In order to clean the flue gases, it is known to use alkaline solutions to wash the furnace gas. This process is expensive and produces its own by-products which must be disposed of properly.

My co-pending patent application entitled "Pollution Control and Heat Recovery", Ser. No. 639,307, filed Aug. 9, 1984 now U.S. Pat. No. 4,597,433, discloses a method for concentrating the noxious sulphur dioxide in the water of condensation of the flue gases. Once the sulphur dioxide is concentrated in the condensate, the problem of economically recovering it still remains.

In the recovery of sulphur dioxide from the burning of sulphur or sulphides, the prior art teaches the use of organic substances added to the wash water in which the sulphur dioxide is dissolved to increase the apparent vapor pressure of the sulphur dioxide so it could be distilled at lower temperatures. Generally, this type of process has not met with much commercial success.

No matter how inexpensive the original agent may be, some small amount is lost in the enormous flow of waste water. This becomes a large expense when the sulphur dioxide content of the waste water is small.

Secondly, recovering the organic additive from both the waste water and sulphur dioxide itself makes the process and apparatus exceedingly complex. This is indicated by U.S. Pat. Nos. 1,946,489 and 2,185,311. Because the application of complex systems threatens the uninterrupted operation of power plants, they are expensive to the point of not being cost effective.

SUMMARY OF THE INVENTION

The invention relates to an apparatus for separating a more volatile substance from a liquid in which it is dissolved, comprising: a substantially gas tight outer shell defining an evacuating space, an inner shell disposed within said outer shell in spaced relation thereto, said inner shell defining a plurality of openings and an inner space, said openings permitting the inner space of the inner shell to communicate with the evacuating space between the inner and outer shells, vacuum means communicating with said evacuating space for maintaining a state of reduced pressure in said evacuating space and for withdrawing the more volatile substance from the evacuated space, introducing means at a first end of said outer shell through which a substance to be separated may be introduced to said inner shell from outside the outer shell, and sized packing material disposed within said inner shell providing a tortuous path of interstices through which the substance to be separated must flow. Preferably the casing has a vertical axis and the flow is downward from the top parallel to the axis. Exit means may be provided to remove the liquid after treatment.

Preferably the apparatus contains perforated dividing plates positioned within the inner shell to divide the inner space into substages and the openings defined by the inner shell are positioned to cause approximately the same volume of volatile substance to be evacuated from each substage of the inner space through the evacuating space.

Also, the evacuating space of the apparatus maybe divided into at least two stages and vacuum means maybe provided to evacuate each of the stages to different pressures.

Preferably the evacuated stages are evacuated to a first pressure which is substantially 7 psia; and a second pressure which is substantially 1 psia.

The sized packing material of the invention is comprised of smaller material and larger material and, the smaller material is positioned closer to the perforated dividing plates at the bottom of each substage.

Alternatively the apparatus according to the invention may have nipples with helical raceways provided on the underside of each dividing plate at each perforation to provide the fluid which flows through each perforation with a helical path.

Refrigerator means may be provided to lower the temperature of the outer shell sufficiently to condense liquid which has evaporated with the more volatile substance and means are provided to return the condensate formed on the outer shell and return it to the distillation process.

A second embodiment of the apparatus for separating a more volatile substance from a liquid in which it is dissolved comprises a substantially gas tight outer casing defining an evacuating space and an axis, a plurality of perforated down pipes positioned within the casing in order to provide a plurality of discrete passages to conduct the substances to be separated therethrough, vacuum means communicating with said evacuating space to maintain a state of reduced pressure within said evacuating space and to withdraw the more volatile substance in gaseous form from the evacuated space, means communicating with a first end of said outer casing to introduce the substances to be separated to the passages of the down pipes, exit means at a second end of the outer casing to withdraw the separated liquid from the outer casing and a helical raceway disposed within each down pipe in order to cause the flow path of the substance to be helical while permitting the central axial portion of each down pipe to be open to permit axial gas flow through each pipe.

In the second embodiment the helical raceways may have a steeper degree of inclination at the beginning of the down pipe than at the end.

The invention also includes the process of vacuum distilling a more volatile component from its solution in a less volatile liquid which comprises: introducing the solution into a chamber having a plurality of successive sub-chambers such that the solution will trickle through each sub-chamber to the next successive sub-chamber is greater than the previous contiguous sub-chamber, creating a vacuum in each of the sub-chambers of differing magnitude such that the vacuum in each successive sub-chamber, and removing the volatile component in gaseous form from each sub-chamber as it is freed. In the process, packing material is provided in each subchamber in order to spread the solution and increase the surface area for evaporation.

Preferably the magnitudes of the vacuum in each subchamber is such that equal volumes of the volatile component are removed from each subchamber. The process may include cooling the withdrawn volatile component slightly to condense any of the less volatile liquid that has been separated with it.

A separating catalyst maybe used in the subchambers to assist in the separation of the more volatile component from the liquid. The catalyst is a packing formed of a substance using a flyash and sulphurous acid paste which is allowed to harden to form packing material.

DESCRIPTION OF THE PREFERRED EMBODIMENT

Figure 1:
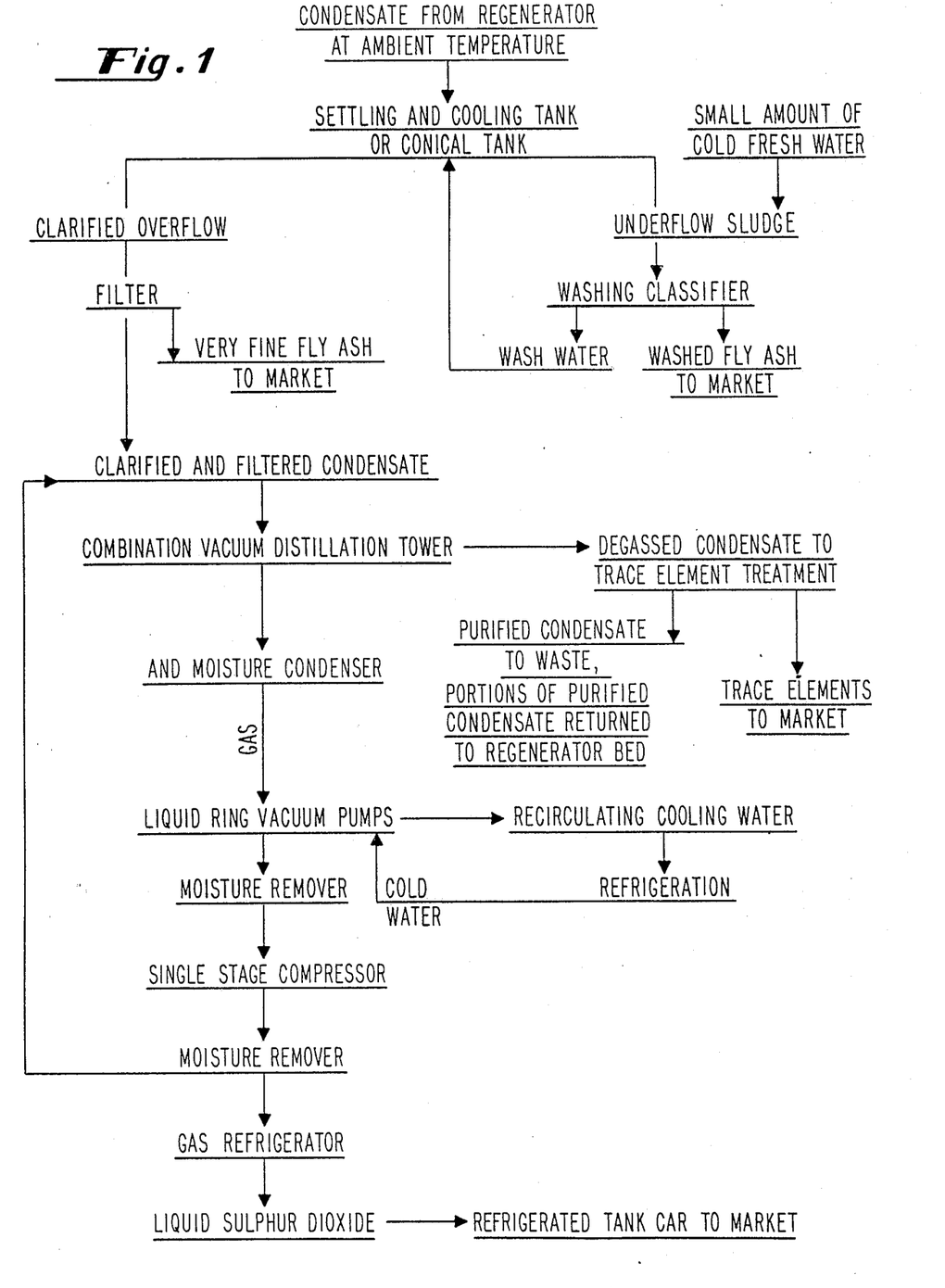
FIG. 1 is a flow diagram showing the process of the invention.

The process of the invention is shown by the flow chart of FIG. 1. The condensate from a heat regenerator with the sulphur dioxide concentrated therein is placed in a settling pond or tank. This equipment can be of the type used in clarifying water in municipal waste treatment plants with the exception that no chemical treatment is necessary. Because of the intense heat of coal burning and surface tension properties of the condensate, each flyash particle forms in a spherical shape of iron, calcium, or magnesium silicate which has no tendency to dissolve or to absorb water. Therefore these unwanted substances are easily separated in the settling pond or tank.

The use of the settling pond or tank is important for a second purpose. While in the pond or tank the condensate will cool from its temperature leaving the heat regenerator to a temperature slightly above ambient. As can be seen from Table I, this increases the vapor pressure ratio between the dissolved sulphur dioxide and the condensate.

TABLE I

VAPOR PRESSURES OF WATER AND SULPHUR DIOXIDE AND RATIO BETWEEN THESE AT VARIOUS TEMPERATURES

| Temperature Degrees Fahrenheit | Vapor Pressures lb. per sq. inch absolute | | Ratio of Vapor Pressure $SO_2/H_2O$ |
|---|---|---|---|
| | $SO_2$ | $H_2O$ | |
| −40 | 3.1 | 0.0019 | 1632 |
| −30 | 4.3 | 0.0035 | 1229 |
| −20 | 5.9 | 0.062 | 952 |

TABLE I-continued

VAPOR PRESSURES OF WATER AND SULPHUR DIOXIDE AND RATIO BETWEEN THESE AT VARIOUS TEMPERATURES

| Temperature Degrees Fahrenheit | Vapor Pressures lb. per sq. inch absolute | | Ratio of Vapor Pressure $SO_2/H_2O$ |
|---|---|---|---|
| | $SO_2$ | $H_2O$ | |
| −10 | 7.9 | 0.011 | 718 |
| 0 | 10.4 | 0.018 | 578 |
| 10 | 13.4 | 0.03 | 447 |
| 20 | 17.2 | 0.05 | 344 |
| 30 | 21.7 | 0.08 | 271 |
| 32 | 22.7 | 0.09 | 252 |
| 40 | 27.1 | 0.12 | 226 |
| 50 | 33.4 | 0.18 | 186 |
| 60 | 40.9 | 0.26 | 157 |
| 70 | 49.6 | 0.36 | 138 |
| 80 | 59.7 | 0.51 | 117 |
| 90 | 71.3 | 0.70 | 102 |
| 100 | 84.5 | 0.95 | 89 |

By increasing the ratio of the vapor pressures, the amount of power necessary in the subsequent separation, refrigeration and compression steps is reduced. The refrigeration and compression is necessary to produce moisture-free sulphur dioxide which will not corrode the vessels in which it is stored.

The substances separated from the condensate are then washed by conventional methods known to those skilled in the art and sold.

The clarified condensate is then filtered in order to remove any very fine flyash which still remains.

Figure 2:
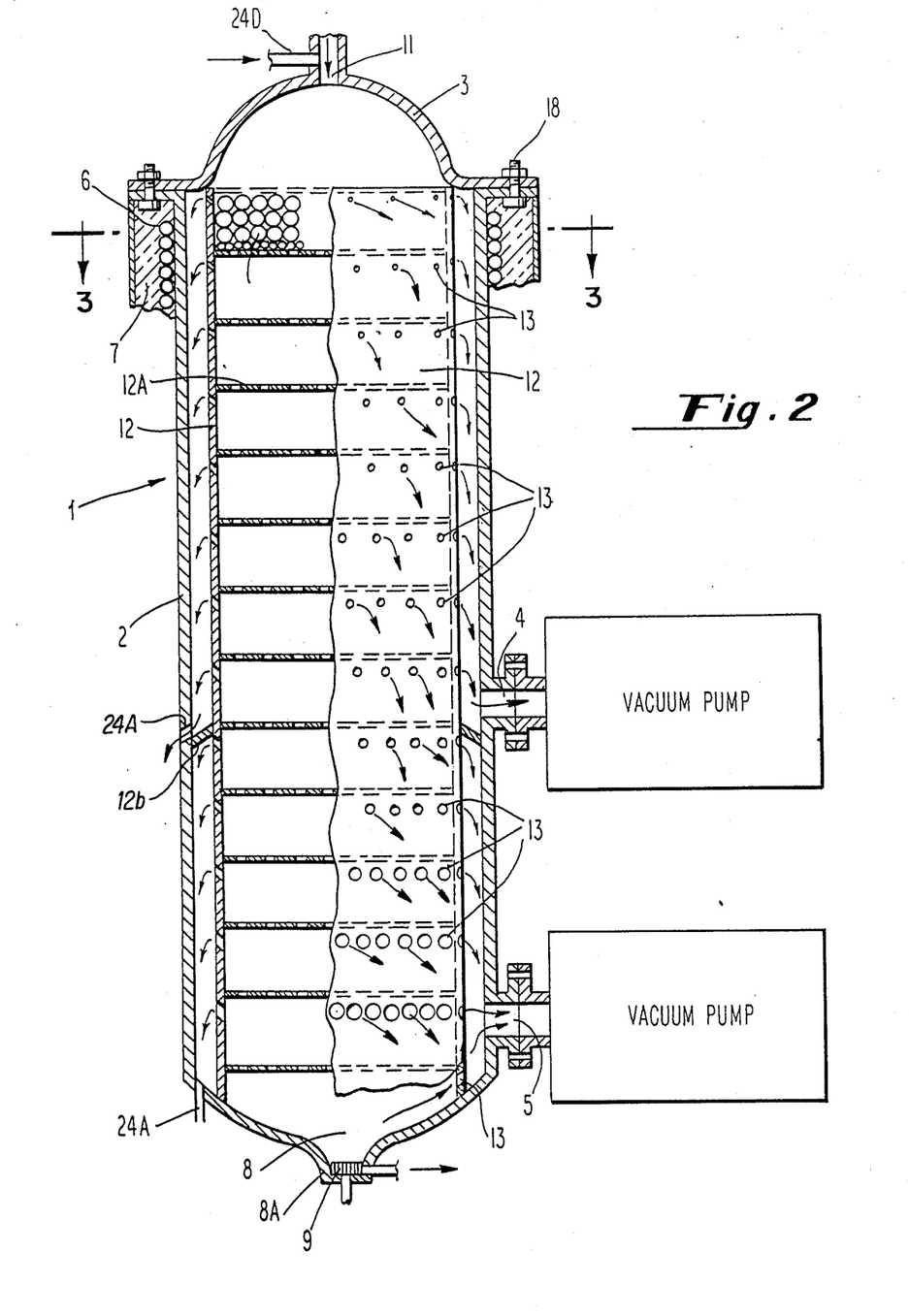
FIG. 2 is an axial cross-sectional view of the distillation column of the invention.

The clarified and filtered condensate is then introduced into the vacuum distillation column of the invention. The vacuum distillation column 1 includes an outer shell 2 which is cylindrical in shape and constructed of acid resistant steel. The outer shell 2 is closed at the top by a removable cover 3 which is made of material similar to the outer shell 2. The cover 3 is mounted on the outer shell 2 by bolts through cooperating flanges on the outer shell 2 and the cover 3.

The outer shell 2 is provided with a first flanged opening 4 which is used to connect the upper stage of the column to a first vacuum pump. The first vacuum pump is used to receive the gas from the upper stage and lower the pressure in the column upper stage to 7 psia. A second flanged opening 5 is provided in the side of the outer shell 2 at a location near the bottom of the column. This opening is connected to a second vacuum pump. The second vacuum pump evacuates gas from the lower stage of the column. In doing this the pressure within the lower stage of the column is reduced from 7 psia at entry to 1 psia at exit.

The outer shell 2 is cooled to approximately 32° F. through refrigeration tubes 6 which are connected to a refrigeration system of a type known to those skilled in the art, such as ice water or brine cooling system. The losses through heat gain are reduced by positioning insulating material 7 on the outer shell 2.

At the very base of the column is the condensate exit 8. The condensate exit 8 is attached to a pump 9 which is positioned to give the condensate a rotating motion as it leaves the column. The bottom of the shell has a descending or funnel shaped wall 8A in order to funnel the condensate to condensate exit 8. The condensate leaves pump 9 and is sent for trace element treatment. Exits 24a are provided for liquid condensing on the outer wall, such liquid is recirculated through the apparatus by the opening 24d.

The cover 3 defines an opening 11. The condensate to be processed is introduced to the distillation column through opening 11. The condensate passes down through a multiplicity of substages of reducing pressure and exits through condensate exit 8.

Disposed within the outer shell 2 is a stainless steel, acid resistant casing 12. The casing 12 is smaller in diameter than shell 2 and when disposed within the shell 2 there is an annular space formed between them. The annular space is divided transversely at a point slightly below the opening 4. This transverse divider 12b separates the upper stage from the lower stage of the column.

Figure 3:
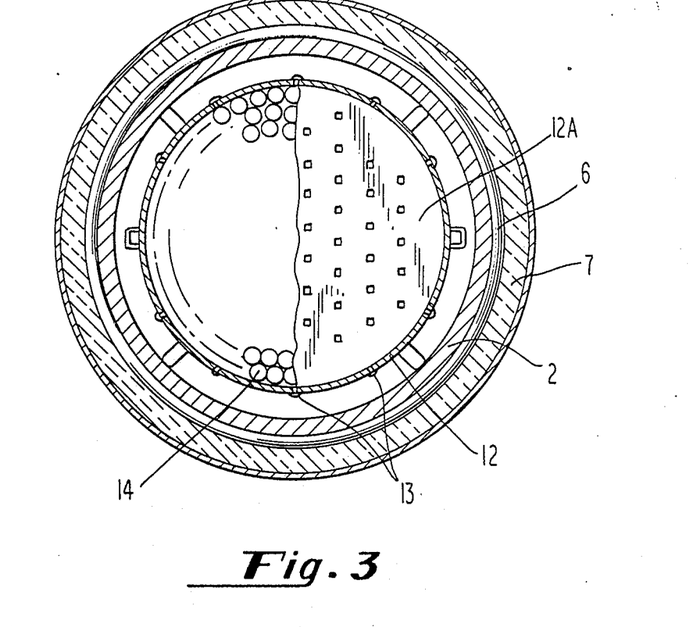
FIG. 3 is a transverse cross-sectional view taken along lines 3—3 of FIG. 2.
Figure 4:
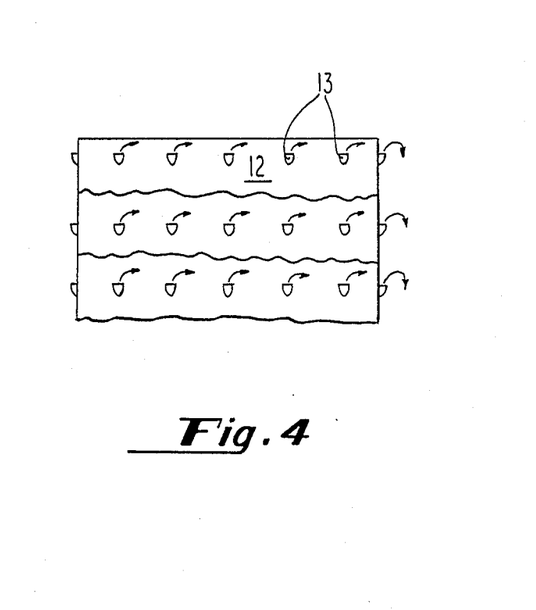
FIG. 4 shows a portion of the acid resistant inner casing of the distillation column.

The casing 12 is provided with a plurality of apertures 13 to permit the gaseous sulphur dioxide to be evacuated from the space inside the casing to the annular space between the casing and shell. The space within the casing is filled with pieces of packing material 14. The packing material 14 may be quartz, volcanic rock, ceramic shapes, boiler slag or the like. The casing 12 is divided into a plurality of sub-stages by perforated plates 12A. Smaller pieces of the packing material are placed at the bottom of each sub-stage in order to prevent the gaseous sulphur dioxide from passing between sub-stages and also to spread the condensate evenly.

The perforated plates separating the sub-stages have an annular outermost portion without perforations. This introduces the condensate to the sub-stage below in an area more confined than the entire sub-stage area. In this way the condensate is directed away from apertures 13 to reduce the amount of liquid unintentionally pulled out through the apertures 13. The packing material is also spaced away from the apertures to form a triangular annular space without packing material. This further reduces the amount of liquid pulled out through apertures 13. Apertures 13 are preferably punched in a cup shape so as to cup upward in order to avoid entrainment of condensate in the exit from the casing.

In operation, the condensate enters the column through opening 11 at ambient temperature. The condensate spreads evenly over the packing material 14 which provides a large surface area for removing the gaseous sulphur dioxide. The condensate flows down through the packing material in the various sub-stages. Each sub-stage has progressively lower internal pressure. The pressure decreases from 14 psia to 7 psia in the upper stage and from 7 psia to 1 psia in the lower stage. There are thirteen sub-stages, each sub-stage has an internal pressure 1 psia lower than the sub-stage immediately above it. The internal pressure of each sub-stage is controlled by the number of apertures 13 in its side wall. By restricting the number of apertures, the amount of gas evacuated at each stage is limited and therefore the pressure drop from sub-stage entrance to sub-stage exit is controlled.

The degree of vacuum in each sub-stage is also dependent upon the vacuum level immediately above and below the sub-stage and the size of the vacuum pump. With the desired 1 psia difference in pressure between contiguous sub-stages, equal amounts of sulphur dioxide gas are removed in each sub-stage, a condition which increases the efficiency.

Two vacuum pumps are used for efficiency, the first pump is connected to first opening 4 and is used to evacuate the first eight sub-stages (the upper stage) at 7 psia. the second pump is connected to second opening 5 and evacuates the last six sub-stages (the lower stage) at 1 psia. The vacuum pumps are of the type with a liquid ring seal between the rotor and the wall of the vacuum pump. The liquid ring seal permits cooling the gas by the cold circulating liquid which is usually ice water.

The enormous amount of condensate as compared to the amount of dissolved sulphur dioxide provides the necessary heat of vaporization to the volatile gas when it is under vacuum. In this way it is not necessary to heat the condensate in order to drive off the sulphur dioxide, thus no energy is expended to raise the temperature of the condensate to drive off the sulphur dioxide, and when cooling the gas to liquify it for storage and shipment, there are energy savings due to the lower temperature of the gas at the start of the cooling process.

Figure 5:
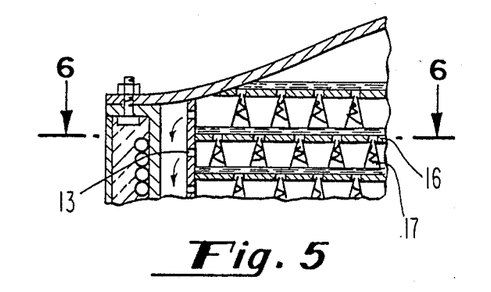
FIG. 5 is a partial axial cross-sectional view of another embodiment of the invention.
Figure 6:
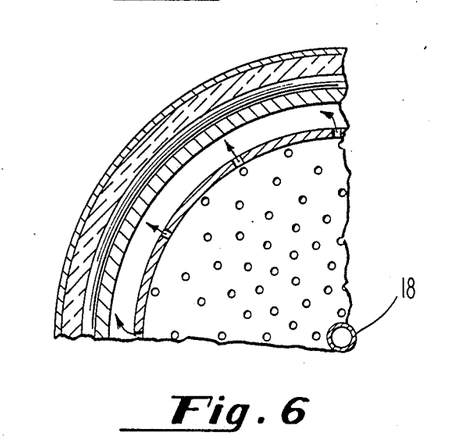
FIG. 6 is a transverse cross-section taken along lines 6—6 in FIG. 5.

An alternate embodiment is shown in FIGS. 5 and 6. The embodiment includes a plurality of sieve-like trays 16 made of stainless steel or acid resistant plastic. The trays are held together by a threaded member 18, such as a bolt. The sieve-like trays 16 replace the packing material which is present in the preferred embodiment. The side wall of the trays has perforations 13 around its periphery to allow the sulphur dioxide to escape radially as in the previously described embodiment. The tray bottoms define holes which allow the condensate to be forced downward by the pressure differential between trays. The extraction of the dissolved sulphur dioxide is enhanced by the use of small helical sluiceways similar to that depicted in FIG. 9. The sluiceway is fitted within a nipple 17 positioned beneath each opening in the tray 16 above. The condensate comes through the opening and is thereby introduced to the sluiceway which imparts a circular motion to the condensate as it descends.

To allow the gas to escape from the helical path, a passage for the gas must be provided at the bottom of the nipple. Therefore, the nipple is flared such that the water travels a helical path of increasing diameter allowing an open core of increasing size as it descends within the nipple. In this way the sulphur dioxide gas evaporates from the water and is blown downwardly and exits from the tray through holes in the tray periphery.

Figure 7:
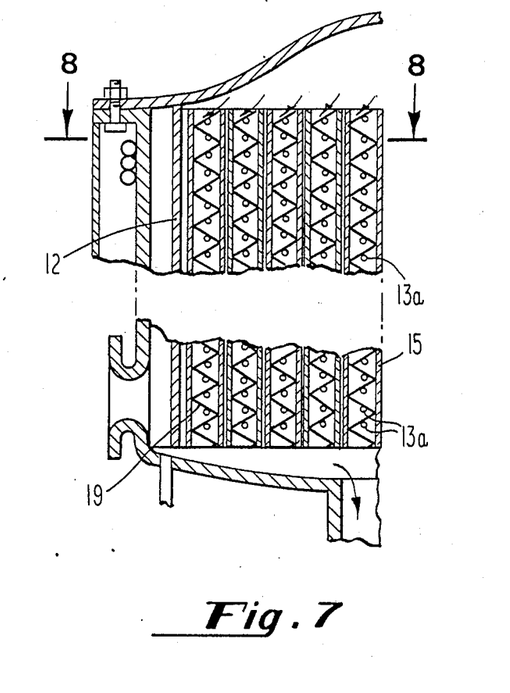
FIG. 7 is a partial axial cross-sectional view of another embodiment of the distillation column.
Figure 8:
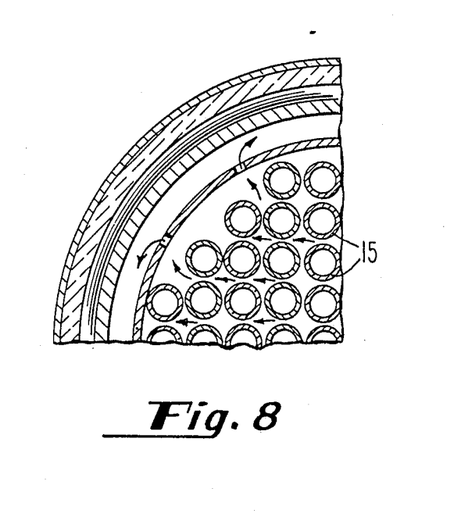
FIG. 8 is a transverse cross-sectional view taken along line 8—8 in FIG. 7.
Figure 9:
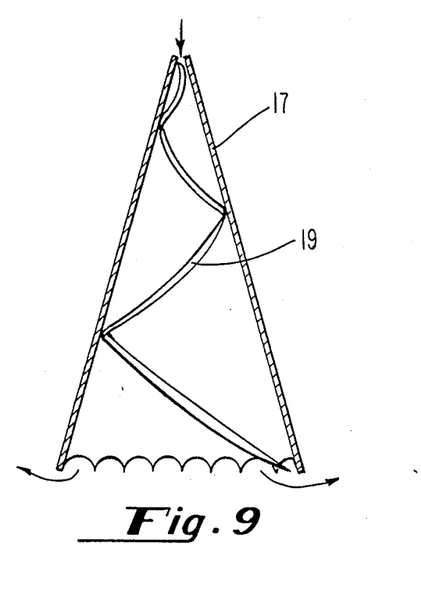
FIG. 9 is a view of a portion of the sluice used in the embodiment depicted in FIG. 7 and FIG. 8.

Alternatively, the tower may be provided with a plurality of tubes or down-pipes running the longitudinal length of the column as shown in FIGS. 7 and 8. The down-pipes 15 are provided with sluices or helical raceways as shown in FIG. 9. The condensate flows down the sluiceway within the down-pipe and the freed sulphur dioxide travels upward in the space outside the down-pipes. The sulphur dioxide is drawn out of the down-pipe through apertures 13a in the pipe wall and further drawn through the inner casing 12 through apertures 13 provided therethrough. It is necessary to remove the gaseous sulphur dioxide from the down-pipe to prevent any possible reabsorption of the gas into the water.

The helical raceway 19 is provided with a steeper degree of incline at the top, to spread the fluid and increase its momentum, and thereafter provided with sufficient angle to maintain a thin stream of condensate spread over the helical raceway 19. The helical raceways permit the gas removed from the condensate to travel upward or downward over the raceways and along the axis of the pipes enclosing them. For this reason the down-pipe may be provided with enlarged openings in its side wall at either end of the down-pipe to permit additional gas escape.

The addition of roughened surfaces on the sluices increases the separation of the sulphur-dioxide from the condensate. The surface may even be striated much as a flat metal file to increase the separation.

In calculating the size of the vacuum tower to provide adequate height and evaporation area, the conditions of the invention should not be confused with the conditions of a common distillation tower. The condensate from flue gas only contains a few percent of sulphur dioxide and its removal from the condensate only cools the condensate a few degrees. Furthermore, in determining the necessary surface area of packing material, it must be remembered that the condensate is being exposed to a greater vacuum at each stage. As very high vacuums are reached, the amount of surface area needed decreases ultimately to that expressed by the Langmuir-Knudsen Interpretation of the Maxwell-Boltzmann Law as shown on page 456 of PRINCIPLES OF VACUUM ENGINEERING by M. Pirani and J. Yarwood, Reinhold Publishing Co. For practical calculations the mass transfer per $cm^2$ of distilland surface is:

Mass Transfer = $0.0583p\ M/T$ grams/$CM^2$ sec.

where:
p = vapor pressure of $SO_2$ at 68° F.(20° C.) = 48 psia = 2482 TORR
M = molecular weight of distilland ($H_2O$) = 18
T = absolute temperature = 273 + 20 = 293

The mass transfer therefore is about 0.40 lbs. of $SO_2$/$in^2$/second as "molecular distillation" is reached.

The water of condensation in flue gas is about one lb. of condensate per lb. of coal, and 0.02 lbs. sulphur dioxide in a 1% sulphur coal. Therefore, if 3300 tons of coal are used per day:

3300 tons/day × 2000 lbs/ton × 0.02 lbs S/lb.coal × 1 day/24 hrs. × 1 hr/3600 seconds = 1.53 lbs. $SO_2$/second therefore a vacuum tower full of 2 in. diameter spherical packing material having a surface area of 12 $in^2$/piece would be governed in design more by the flooding limits of the area of packing exposed than the packing area exposed for evaporating the sulphur dioxide.

Evaporating $SO_2$ around 70° F. requires about 150 BTU/lb which would lower the 50 lbs. of water in which it is dissolved about 3° F. The vapor pressure of water at 70° F. is only about 0.36 psia compared to 49 psia for sulphur dioxide therefore moisture in the sulphur dioxide gas does not present a great problem.

Figure 10:
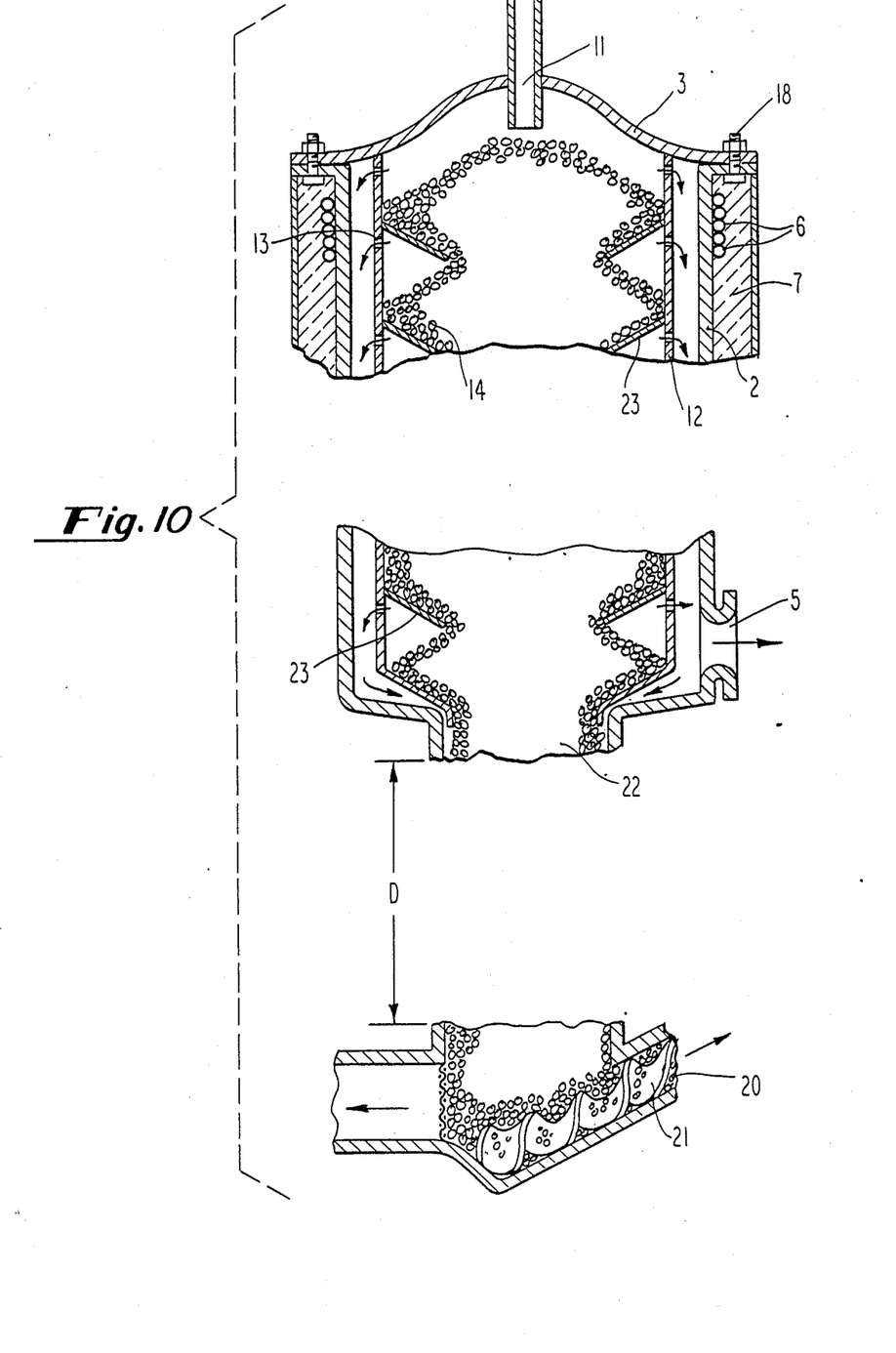
FIG. 10 is a third embodiment of the invention.

A third embodiment of the invention is shown in FIG. 10. In this embodiment the column is continuous, that is there are no separate sub-stages. The inner casing is filled with a packing material 14 or catalyst such as metal particles, coal, graphite, sulphur, molybdenite, realgar or carborundum. Fresh packing material may be continuously added to the column through opening 11 while used material is removed through conduit 20 via auger 21. The vacuum leg 22 has a height of about 33 feet and assists the vacuum pump in creating a vacuum in the column. Plates 23 are provided to direct the packing material and condensate away from openings 13. This prevents the condensate from being pulled out through openings 13.

To aid in the understanding of the present invention, the following example is provided:

EXAMPLE I

This example is based upon a power plant burning 3300 tons of bituminous coal per day and producing 3300 tons of condensate per day containing 2% sulphur dioxide. This corresponds to a coal necessarily containing somewhat more than 1% sulphur because some sulphur reports in the ash and also because probably not more than 90% of the $SO_2$ in the flue gas can be dissolved in the condensate in a flue gas heat regenerator. The type of distillation tower used in the example is that idealized in FIG. 2 with fourteen stages of vacuum down to 1 psia (52 Mm Hg or 52 Torr). The first eight stages starting at 14 psia down to 7 psia are evacuated at 7 psia to the first vacuum pump while the last six stages beginning at 6 psia are evacuated to a second vacuum pump at 1 psia.

It is a concept of this invention that the volume of gas evolved at each stage of vacuum should be equal for efficiency although the weight of gas vapor per cubic foot must decrease in proportion to the degree of vacuum from 14 psia to 1 psia. The condensate temperature entering the distillatin tower is assumed to be ambient temperature of 70° F. where the weight of one cubic foot of $SO_2$ at 14.7 psia is 0.629 lbs. Since the weight of $SO_2$ to be removed in idealized fashion at 100% efficiency is 1.528 lbs/second (3300 tons/day × 2000 lb/ton × 2% $SO_2$ lb. coal divided by (24 hrs. × 3600 sec/hr)). This represents the sum total of equal volumes of gas from the 14 stages in Table II below totaling 4.48 cu. ft. and 1.528/4.48 = 0.341 cu. ft. per second per stage used in multiplying the lbs./cu.ft. of each stage by the lb/sec of each stage.

TABLE II
Showing Conditions in Example I

| Stage | Pressure psia | Weight lb/cu.ft. | lbs. $SO_2$ per sec. | cumulative | cu.ft. $SO_2$ per sec. | per min. |
|---|---|---|---|---|---|---|
| 1 | 14 | .599 | .204 | | | |
| 2 | 13 | .557 | .190 | | | |
| 3 | 12 | .511 | .174 | | | |
| 4 | 11 | .459 | .157 | | | |
| 5 | 10 | .428 | .146 | | | |
| 6 | 9 | .386 | .132 | | | |
| 7 | 8 | .342 | .117 | | | |
| 8 | 7 | .300 | .102 | 1.222 | 4.07 | 244 |
| 9 | 6 | .257 | .088 | | | |
| 10 | 5 | .214 | .073 | | | |
| 11 | 4 | .171 | .058 | | | |
| 12 | 3 | .128 | .044 | | | |
| 13 | 2 | .086 | .029 | | | |
| 14 | 1 | .042 | .014 | .306 | 7.29 | 437 |
| Total | | 4.480 | 1.528 | | | |

To maintain the above 0.341 cu. ft./sec. of $SO_2$ gas exiting from each stage the equation given on page 344 of Marks' Handbook, 4th Edition may be used to determine the number of ⅜ in. diameter holes necessary in the inner casing 12 around the periphery of each stage of sized packing material. Once this is determined, final design may use much smaller holes of the same or larger aggregate area to allow shorter path for gas from the packing material to the refrigerated shell of the distillation tower.

The preceding calculations and those which follow should allow those wishing to practice this invention ready means for approximating the dimensions and controls needed for design since the calculations are applied to a specific example.

In important feature of this invention is the radial release via shortest path of the gas from the condensate to the refrigerated outside wall of the vacuum tower, the formula for orfice computation from *Mark's Mechanical Engineers Handbook*, 5th Edition, Pg 333 shows the number of three-eighths inch orifices listed in the table below for the removal of the same volume of $SO_2$ per second form each stage.

| Stages | 1 | 2 | 3 | 4 | 5 | 6 | 7 | 8 |
|---|---|---|---|---|---|---|---|---|
| p2 | 1008 | 1008 | 1008 | 1008 | 1008 | 1008 | 1008 | 1008 |
| p1 | 2016 | 1872 | 1728 | 1584 | 1440 | 1296 | 1152 | 1008 |
| p1/p2 | 2 | 1.857 | 1.714 | 1.571 | 1.429 | 1.286 | 1.143 | 1.0 |
| no. orfices | 16 | 16.1 | 16 | 15.9 | 16.9 | 18.5 | 23 | 500+ |

| Stages | 9 | 10 | 11 | 12 | 13 | 14 |
|---|---|---|---|---|---|---|
| p2 | 144 | 144 | 144 | 144 | 144 | 144 |
| p1 | 864 | 720 | 576 | 432 | 288 | 144 |
| p1/p2 | 6 | 5 | 4 | 3 | 2 | 1 |
| no. orfices | 3.6 | 3.2 | 2.9 | 2.6 | 2.2 | 500+ |

Two vacuum pumps, each with a capacity of 100 cfm would be required for this example to take care of any increase in sulphur content of coal up to double that in this example, since no feed of coal can be uniform without enormous expense for bedding layers and then withdrawing slices. Two compressors would be needed to bring the $SO_2$ gas to 15 psi guage pressure following gas-liquid separators after each of said vacuum pumps. Also gas-liquid separators must follow the compressors, and while most of the separation is by refrigeration, final drying of $SO_2$ before liquifaction is best done by passing it over $H_2SO_4$ kept concentrated by adding $SO_3$ to it. The small amount of $SO_3$ needed is made by well-known catalytic treatment of a small side stream of $SO_2$.

While the above relate chiefly to the process and means of extracting sulphur dioxide from power plant condensate or condensate from burning any fossil fuel, this vacuum process may advantageously be used for extracting many types of vapor from liquids in which it is dissolved. In some cases catalysts may advantageously be employed. For example, in the case of carbon dioxide dissolved in water striated metals with a metallic luster like an iron file catalyze bubble formation as do some minerals with an adamantine or resinous luster like coal. Once a tiny bubble is formed, it is lifted by the enormous force of the weight of liquid which it displaces. Under vacuum, which expands a bubble as much as 150 times or more, this lifting force is enormous.

In the case of separating sulphur dioxide from flue condensate, a unique catalyst is used. Flyash is mixed with sulphurous acid to form a paste-like substance which may be formed into any desired shape and then allowed to harden. Upon hardening, the substance acts as a catalyst in separating out the sulphur dioxide.

To achieve higher recovery of $SO_2$ gas within the lowest beds of the regenerator, a portion of the degassed condensate is returned thereto in a quantity and manner to achieve the desired result.

I claim:

1. A method for removing volatile gas from a liquid, comprising the steps of:

providing a double wall chamber, the walls of the chamber being formed of thermally conductive material, the outer surface of the outer wall being directly contacted by refrigerant conduit means and the inner wall forming an inner chamber within said outer chamber, said inner chamber being divided by a plurality of perforated horizontal members into a vertically extending array of sub-stages, each of said sub-stages communicating with an annular space formed between the inner wall and the outer wall by a plurality of holes in the inner wall, the number of the holes in the inner wall forming the inner chamber varying from one sub-stage to the next such that the overall area for gas flow from each sub-stage provided by the holes in the inner wall increases progressively from the top to the bottom of the array of sub-stages, an aperture being formed in the top of the inner chamber for introducing the liquid having a volatile gas dissolved therein, a drain at the bottom of the inner chamber for removing liquid therefrom and a drain at the bottom of the annular space between the inner and outer walls for removing condensed volatile gas therefrom;

supplying a refrigerant to said refrigerant conduit means to chill the outer wall of the vessel;

introducing the liquid with volatile gas dissolved therein through said inlet at the uppermost portion of said vessel;

allowing said liquid to flow gradually downwardly through said sub-stages;

applying a vacuum to the annular space between the inner and outer walls, such that the volatile gas is removed from the liquid in each of the sub-stages, the aggregate area of the holes in the inner wall varying from one sub-stage to the next in a manner such that essentially equal amounts of volatile gas are withdrawn through the holes in each of the sub-stages; and withdrawing the condensed volatile material from the drain at the bottom of the annular space between the inner and outer walls of the vessel.

2. The method of claim 1, wherein a wall is provided dividing said annular space into two subspaces, and wherein said method comprises the further step of applying vacuum separately to each of said two subspaces.

3. The method of claim 1, comprising the further step of filling said sub-stages with packing materials to control the flow of said liquid therethrough.

4. The method of claim 3, wherein said packing materials at least in one of said sub-stages comprises elements of several differing sizes.

5. The method of claim 1, comprising the further step of withdrawing the liquid, having had the volatile substance removed therefrom, from the drain in the inner chamber of the vessel.

* * * * *